(12) United States Patent
Lau et al.

(10) Patent No.: US 8,492,953 B2
(45) Date of Patent: Jul. 23, 2013

(54) LAMINATION

(75) Inventors: James Ching Sik Lau, Hong Kong (CN); Duncan Yiu Lung Wong, Hong Kong (CN); Chi Hang Ngai, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 11/819,614

(22) Filed: Jun. 28, 2007

(65) Prior Publication Data

US 2008/0001496 A1    Jan. 3, 2008

(30) Foreign Application Priority Data

Jun. 30, 2006 (CN) .......................... 2006 1 0100197

(51) Int. Cl.
*H02K 1/24* (2006.01)
(52) U.S. Cl.
USPC ....... 310/269; 310/40 MM; 310/43; 310/186; 310/187; 310/215; 310/216.081
(58) Field of Classification Search
USPC ............. 310/43, 186, 187, 215, 269, 40 MM, 310/214, 216.081
IPC ....................................................... H02K 1/24
See application file for complete search history.

(56) References Cited

U.S. PATENT DOCUMENTS

| | | | | |
|---|---|---|---|---|
| 2,986,663 A | * | 5/1961 | Ellis et al. | 310/60 R |
| 3,334,255 A | * | 8/1967 | Peters | 310/215 |
| 3,384,255 A | * | 5/1968 | Hickman | 414/620 |
| 3,735,169 A | * | 5/1973 | Balke et al. | 310/214 |
| 3,852,137 A | * | 12/1974 | Balke et al. | 156/196 |
| 4,037,320 A | * | 7/1977 | Wilding | 29/733 |
| 4,274,025 A | * | 6/1981 | Nerurkar et al. | 310/215 |
| 4,432,135 A | * | 2/1984 | Greenlee | 29/598 |
| 4,433,262 A | * | 2/1984 | Greenlee | 310/214 |
| 4,554,491 A | * | 11/1985 | Plunkett | 318/400.41 |
| 4,563,808 A | * | 1/1986 | Lender | 29/596 |
| 5,057,725 A | * | 10/1991 | Kasai et al. | 310/51 |
| 5,095,238 A | * | 3/1992 | Suzuki et al. | 310/156.46 |
| 5,177,390 A | * | 1/1993 | Van Maaren | 310/183 |
| 5,274,292 A | * | 12/1993 | Lemmer et al. | 310/233 |
| 5,444,318 A | * | 8/1995 | Stumpf | 310/77 |
| 5,598,071 A | * | 1/1997 | Dunfield et al. | 318/400.11 |
| 5,705,874 A | * | 1/1998 | Grudl | 310/216.091 |

(Continued)

FOREIGN PATENT DOCUMENTS

GB    2 248 524 A    4/1992

OTHER PUBLICATIONS nomex.pdf : http://en.wikipedia.org/wiki/Nomex (no date).*
plastic.pdf : http://en.wikipedia.org/wiki/Plastic (no date).*

(Continued)

*Primary Examiner* — John K Kim
(74) *Attorney, Agent, or Firm* — Birch, Stewart, Kolasch & Birch, LLP

(57) ABSTRACT

A small PMDC motor has a wound salient pole armature. The armature 22 has a winding guide 38 disposed within each winding tunnel 36 formed between adjacent salient poles of the armature. The winding guide 38 is arranged to separate the radially inner portion of the respective winding tunnel whereby windings 30 wound about the adjacent salient poles of the armature are restrained from entering into the opposite radially inner portion of the winding tunnel 36.

12 Claims, 4 Drawing Sheets

U.S. PATENT DOCUMENTS

| | | | |
|---|---|---|---|
| 5,811,907 A * | 9/1998 | Fukuda et al. | 310/216.073 |
| 5,883,449 A * | 3/1999 | Mehta et al. | 310/60 R |
| 5,886,446 A * | 3/1999 | Katagiri et al. | 310/214 |
| 5,973,432 A * | 10/1999 | Katagiri et al. | 310/214 |
| 6,080,352 A * | 6/2000 | Dunfield et al. | 264/427 |
| 6,225,723 B1 * | 5/2001 | Cooper et al. | 310/214 |
| 6,316,850 B1 * | 11/2001 | Nakamura | 310/40 MM |
| 6,342,740 B1 * | 1/2002 | Mabuchi | 310/40 MM |
| 6,568,066 B2 * | 5/2003 | Furuya et al. | 29/598 |
| 6,590,311 B1 * | 7/2003 | Wang et al. | 310/261.1 |
| 6,703,731 B2 * | 3/2004 | Lee | 310/68 B |
| 6,745,973 B2 * | 6/2004 | Burch | 242/432.3 |
| 2002/0113519 A1 * | 8/2002 | Brown | 310/254 |
| 2002/0135256 A1 * | 9/2002 | Nikolic et al. | 310/178 |
| 2003/0107291 A1 * | 6/2003 | Takahata et al. | 310/216 |
| 2006/0033400 A1 * | 2/2006 | Totsu et al. | 310/254 |
| 2006/0138877 A1 * | 6/2006 | Akabane | 310/43 |
| 2006/0163965 A1 * | 7/2006 | Chen et al. | 310/186 |
| 2008/0001496 A1 * | 1/2008 | Lau et al. | 310/269 |
| 2010/0213885 A1 * | 8/2010 | Ichiyama | 318/720 |

OTHER PUBLICATIONS

Bulletin.pdf : http://www.eis-inc.com/files/pdf/ supplier_showcase_page_downloads/stone/Nomex_Aramid_Tubing_BulletinP9.pdf (no date).*

* cited by examiner

LAMINATION

CROSS-REFERENCE TO RELATED APPLICATIONS

This non-provisional patent application claims priority under 35 U.S.C. §119(a) from Patent Application No. 200610100197.1 filed in China on 30 Jun. 2006.

BACKGROUND OF THE INVENTION

This invention relates to small PMDC motors and in particular, to the laminations forming the core of the armature for such a motor.

In small PMDC motors, the rotor or armature typically has a laminated core. The laminations are stamped from sheet electrical steel and stacked together to form the armature core which is pressed onto a shaft along with a commutator. The core is then placed in a winding machine where wire, typically enamel coated copper wire is wound about salient poles of the core and terminated on the commutator.

In three pole armatures, the wires are wound around individual poles, where as for armatures with higher number of poles, the windings may be wound about groups of poles.

In individually wound poles, the windings of adjacent poles occupy or share a common winding tunnel which is the space between adjacent poles. For armatures having a high fill rate and/or having fine wire size, the first winding to be wound may fill up the bottom of the winding tunnel spreading into the area which ideally should be occupied by the adjacent winding which is yet to be wound. Thus when the adjacent winding is wound, it is wound, at least partially, on top of the previously wound winding. This leads to a number of problems, including the second winding being larger than the first winding and the last winding is likely to be bigger yet again as it is wound between two adjacent windings. This means that although the number of turns of each winding is the same, the amount of wire used is different as the later windings are wound along a longer path. Thus the resistance of each winding will be different, which for thin and very thin wires can have an adverse effect on motor performance. Also, the greater volume of wire means that the windings are not the same weight, leading to a problem in balancing the motor, i.e., if the armature core is almost balanced before winding, after winding the armature will be significantly out of balance and when automated balancing machines are used to balance the armature, this may have an adverse effect on performance as the automatic balancing machines operate on a material removal principle and remove material from the armature core to balance the armature. The more material that is removed from the core, the bigger the effect on performance. Another important consideration, in the balance of the armature, is the radial positioning of the coils. If this is not the same, the dynamic balance of the armature will be adversely affected. By radial positioning we mean the radial distance between the axis of the armature to the center of mass of the coil. Differences in this distance between the coils of an armature will affect the dynamic balance of the armature leading to vibration in use if not corrected.

Thus it is an object of the present invention to provide a lamination for an armature which can be wound using a winding machine which provides for separation of windings about individual poles of the armature, in a simple yet effective manner.

SUMMARY OF THE INVENTION

Accordingly, the present invention provides a small PMDC motor having a wound salient pole armature wherein the armature has a winding guide disposed within a winding tunnel formed between adjacent salient poles of the armature and arranged to separate the radially inner portion of the winding tunnels whereby windings wound about the adjacent salient poles of the armature are restrained from entering into the opposite radially inner portion of the winding tunnel.

Preferably, the winding guide comprises a vane located within each winding tunnel, each vane extending along the winding tunnel and extending radially outwardly from a radially inner surface of the winding tunnel.

Preferably, the vane extends along a plane bisecting the winding tunnel.

Preferably, the vane extends radially to a height sufficient to separate the windings sharing the winding tunnel.

Preferably, the armature core is formed of stacked laminations of electrical steel and the vanes are formed by fingers of the laminations.

Preferably, the salient poles are substantially T-shaped having a radially extending spoke extending from a central region and a circumferentially extending pole head forming a pole face facing radially outwardly, each pole head extending between circumferentially spaced tips, a winding gap being formed between tips of adjacent pole heads and the winding tunnels being formed between the central region and the spoke and pole head of adjacent poles and being open radially through the winding gap, wherein the vanes extend along a radial plane, bisecting the winding tunnel and projecting towards the winding gap and having a radial height sufficient to separate adjacent windings within the winding tunnels but equal to or less than the height of a radial line extending through the vane and being cut by a line extending from an adjacent tip of one adjacent pole head to an adjacent tip of another adjacent pole head.

Optionally, the radial height of the vanes is substantially equal to the height of a radial line extending through the vane and cut by a line extending from an adjacent tip of an adjacent pole head to a root region.

Optionally, the height of the finger is approximately half of the height of the winding tunnel.

Preferably, the winding guide is a separately formed item fitted to the armature core before winding.

Preferably, the winding guide is of insulating material and forms an insulation barrier between adjacent windings.

Preferably, the winding guide is an integral part of the slot insulation.

Optionally, the slot insulation is molded directly onto the core.

Optionally, the winding guide is a removal barrier.

Preferably, the winding guide is at least partially formed of low friction material, especially PTFE.

Optionally, the winding guide is a part of the winding machine.

Preferably, the armature is a three pole armature.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS

Figure 1:
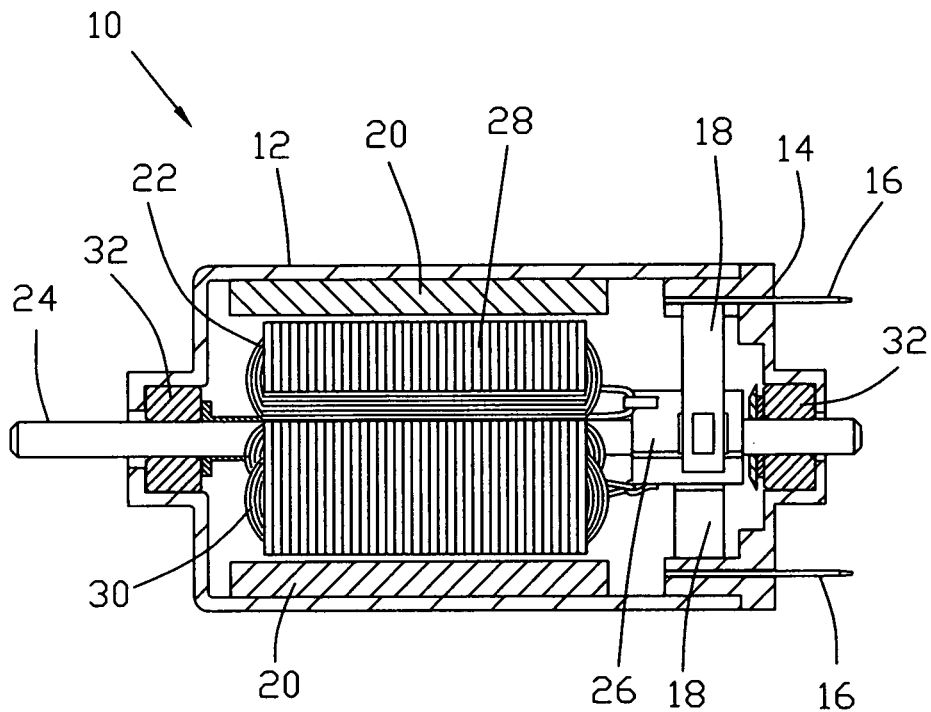
FIG. 1 is a PMDC motor to which the present invention is applicable.

FIG. 1 illustrates a common small size PMDC motor 10 as used, for example, in automotive accessories and battery powered applications. Motor 10 is shown in partial section to show the inner workings. Motor 10 has a cup shaped housing 12 and an end cap 14 closing the open end of the housing 12. The end cap 14 is typically of an insulating plastics material or has a liner of insulating plastics material which supports motor terminals 16, a pair of leaf type brush assemblies 18 and optionally other electrical components of the motor such as noise suppression components such as chokes and capacitors. Housing 12 accommodates a permanent magnet stator 20 and a wound rotor or armature 22. Armature 22 has a shaft 24 on which is mounted a commutator 26 and a armature core 28 having a number of salient poles. Windings 30 are formed about the salient poles and terminated on the commutator 26. Each winding 30 comprises a number of turns of insulated electrical wire forming a coil wound about respective individual poles of the core 28. The armature core 28 is a stack of laminations stamped from sheet electrical steel. The shaft 24 is journalled in bearings 32 held by the closed end of the housing 12 and by the end cap 14.

In use, the motor is operated by connecting the motor terminals to a source of suitable electrical power. Power is transferred from the terminals to the armature windings via the brush gear and commutator, the brush gear making sliding contact with the commutator as the armature rotates.

Figure 2:
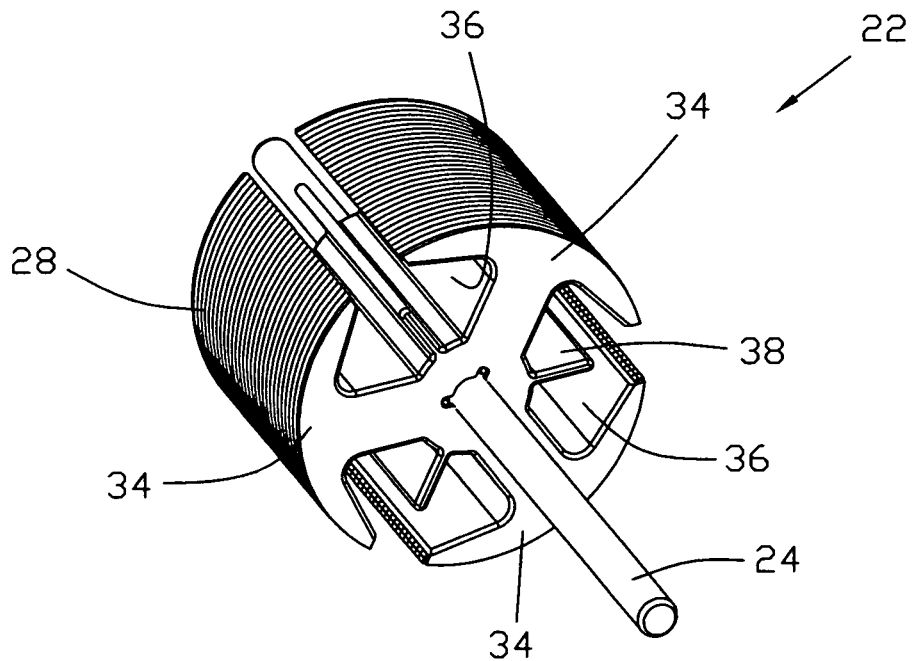
FIG. 2 is an armature of the PMDC motor of FIG. 1, in accordance with a preferred embodiment.

The preferred armature is a 3 pole armature meaning that it has three salient poles 34 about which respective armature windings are wound, one winding per pole. FIG. 2 shows an unwound 3 pole armature to more clearly illustrate the structure of the core of the armature. The core 28 of the armature is formed from a stack of armature laminations. The core 28 is coated with an epoxy coating in the region of the windings, namely the axial ends and the inner surfaces of the winding tunnels 36, i.e., the spaces between adjacent poles which accommodate the windings. Within each winding tunnel is a radially and axially extending vane forming a winding guide 38 as will be explained hereinafter.

Figure 3:
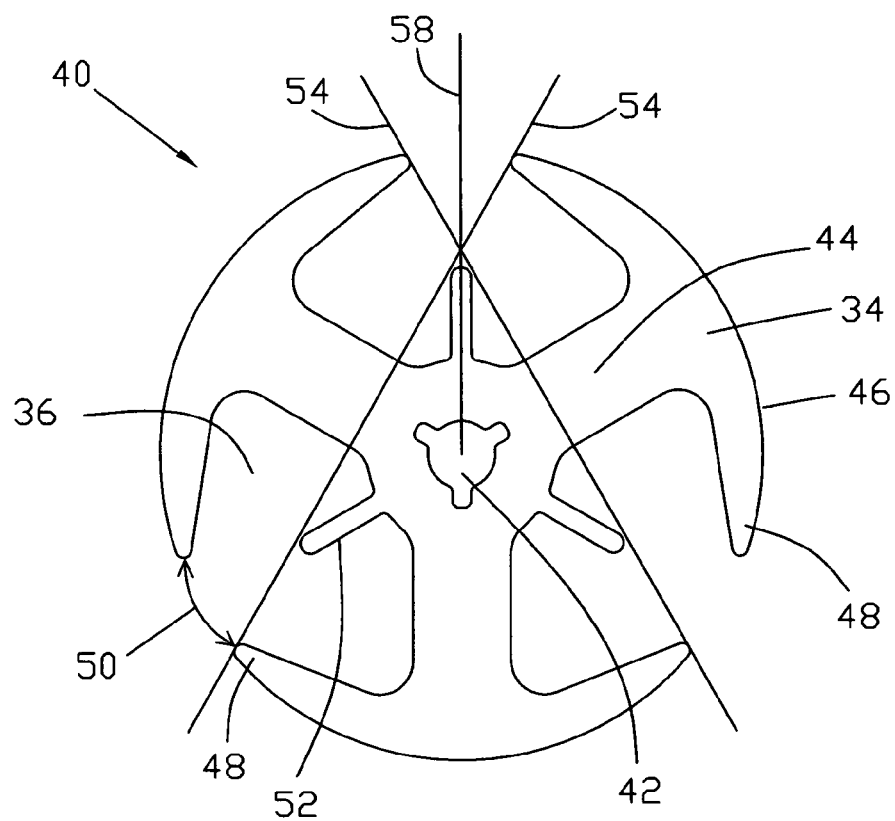
FIG. 3 is a lamination of the armature of FIG. 2.

FIG. 3 illustrates a preferred three pole armature lamination 40 according to the present invention. The lamination 40 is stamped from sheet electrical steel and has a central hole 42 for receiving the shaft. From the central region, three equally spaced poles 34 extend radially. Each pole 34 has a generally T-shaped configuration having a radially extending spoke 44 and a circumferentially extending cap or pole face 46. The ends or tips 48 of the pole face of each pole face the tips of an adjacent pole across a small gap known as the winding gap 50. Radially inward of the winding gap 50 is a larger space which forms a passageway in the stacked core known as the winding tunnel 36 where the windings locate as described above.

Figure 4:
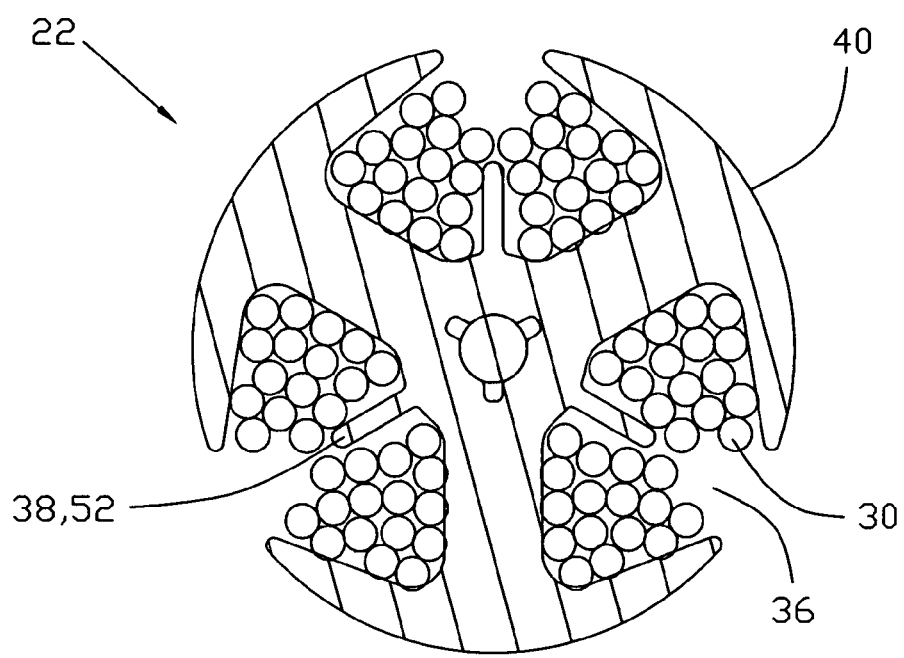
FIG. 4 is a schematic sectional view showing windings superimposed on the lamination of FIG. 3.

In between the pole spokes 44 are smaller radial projections known as fingers 52. Fingers 52 effectively divide the lower portion of the winding tunnel 36 into two separate sides. Thus during winding, the fingers 52 guide the wire to lay in its own half of the lower portion of the winding tunnel 36 next to the pole 34 about which the wire is being wound. When the laminations are stacked to form the core, the fingers 52 form a ridge or vane which we call the winding guide 38. Thus, when winding the wire about the adjacent poles, the wire can be wound close to the base or root of the pole spoke 44 as the previous winding has not already taken up the space at the bottom of the winding tunnel. This is shown schematically in FIG. 4 when the windings are shown superimposed on the lamination of FIG. 3. Thus each winding has the same physical shape, occupies a similar space, both volume and radial location, and uses the same amount of wire. Thus the windings do not create an out of balance situation as occurs with the prior art laminations.

The finger 52 may be of any suitable shape and size as long as it provides an effective separation between the windings and preferably, is not so large that it interferes with the operation of the normal winding machine or requires any modification of the standard winding mechanism of a winding machine. The thickness of the finger must be sufficient for the finger to have enough strength to withstand the force applied by the winding without deforming significantly. Of course, minor or insignificant deformation, though not desirable, could be acceptable and still offer significant improvement over the prior art.

Figure 5:
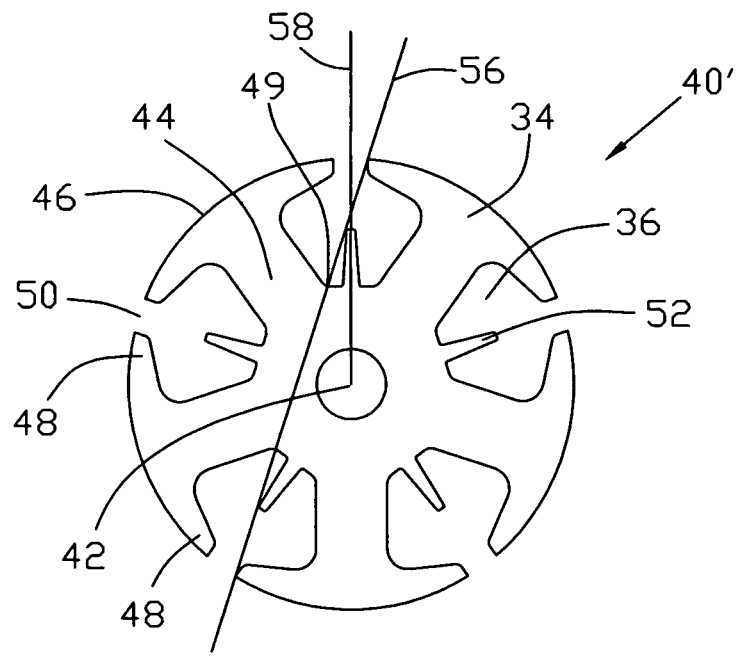
FIG. 5 is a lamination for a five pole armature in accordance with another preferred embodiment of the present invention.

FIG. 5 illustrates a five pole lamination 40' according to another embodiment of the present invention. Here again, the fingers 52 extend radially between the spokes 44 of the adjacent poles 34 of the lamination bisecting the space between adjacent spokes which forms the winding tunnel 36.

The height of the fingers and thus the winding guides should be chosen so as not to interfere with the winding of the coils about the poles. As shown in FIG. 3, the maximum height of the winding guide should be so that the top of the winding guide just touches a line 54 from the tip of the pole head of the pole adjacent to the pole under consideration to the adjacent tip of the pole heads of the other adjacent pole on the other side of the pole under consideration. Line 54 represents the feed path of the wire as it is being wound about the pole. Line 58 represents the radial plane bisecting the winding tunnel, which is the radial direction of the winding guide. This maximum height may be described as the intersection of line 54 with line 58.

In practice, the height of the winding guide will be less than maximum for most applications. For lamination designs with very small winding gaps or with a very low fill rate, the height of the guide finger may be significantly shorter than this line. For a five pole armature, as shown for example in FIG. 5, the height may be close to the height that touches a line 56 drawn from the tip 48 of the adjacent pole face 46 to the root 49 of the pole spoke 44. The root of the pole spoke is the location at which the pole spoke joins with the central region of the lamination. The root region is the point or area where the adjacent edge of the spoke of the initial pole joins the surface of the central region, ignoring any fillet corners or radialization of the intersection. It is the bottom or inner edge of the winding tunnel. As such, the desired height of the winding guide for a five pole armature may be considered as the intersection of line 56 with line 58.

A minimum height of the guide fingers will depend on the design of the lamination and the application, i.e., how full the winding tunnels are as the fingers are only needed to separate the adjacent windings. For motors with few windings, e.g. less than 40% fill of the tunnels, then short fingers will be sufficient but for high fill motors, e.g., 60% to 70%, then longer fingers will be required. It will be readily apparent to those skilled in the art that due to winding dynamics the radially outer portions of the windings are naturally wound closely to the pole spoke and do not require additional separation guides. Thus the fingers do not need to extend radially outwardly passed the outermost turn of each winding. However, if the vanes are too short, then the windings will fall over the vanes and the winding guide will not be effective. As will be appreciated, the vane does require sufficient structural strength to resist deforming or bending under the presence of the first winding so as to not interfere with the space reserved for the second winding. Here again, this is a compromise as some bending can be tolerated and a completely rigid vane may be so big as to occupy a significant space in the winding tunnel originally available for the windings.

While the preferred embodiments have guide fingers formed integrally with the laminations, it is possible to implement this invention using separate guide fingers which are located within the winding tunnels during winding. Such separate guide fingers may be formed as part of a slot insulation arrangement or as a phase insulation arrangement or as an independent part. As an independent part, it may be left in the motor or it may be removed after winding.

Figure 6:
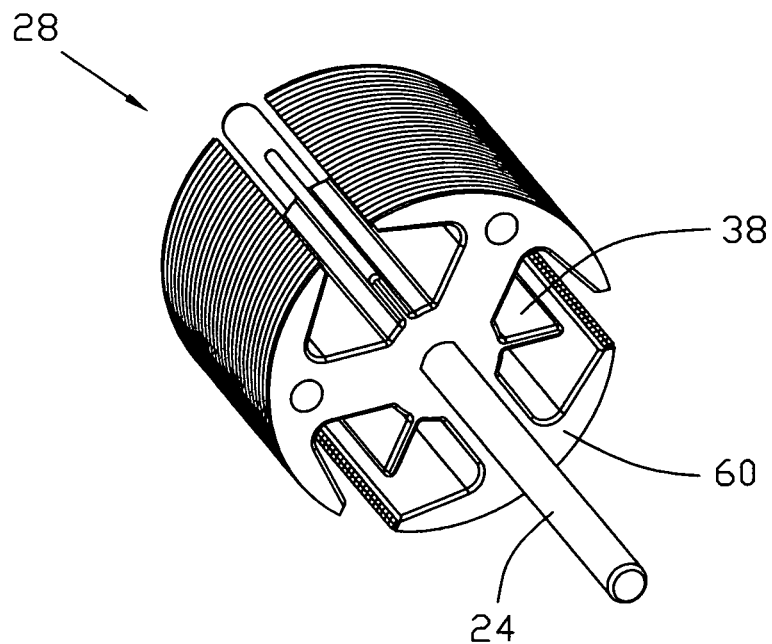
FIG. 6 shows an unwound core for a three pole armature with a winding guide according to another embodiment of the present invention.

FIG. 6 shows an unwound three pole armature core fitted to the shaft. The armature core has a winding guide according to the present invention. In this embodiment, the winding guide is overmolded onto the armature core as an integral part of a slot liner. This is achieved by placing the core and shaft into the mold of an injection molding machine and injecting plastics material into the mold to form the slot insulation and the wire guide. The slot insulation is a thin layer covering the core in the area supporting or otherwise likely to contact the wires, i.e., inside surface of the winding tunnels and the axial end faces of the core. This type of slot lining is an alternative to the epoxy coating more commonly used.

Figure 7:
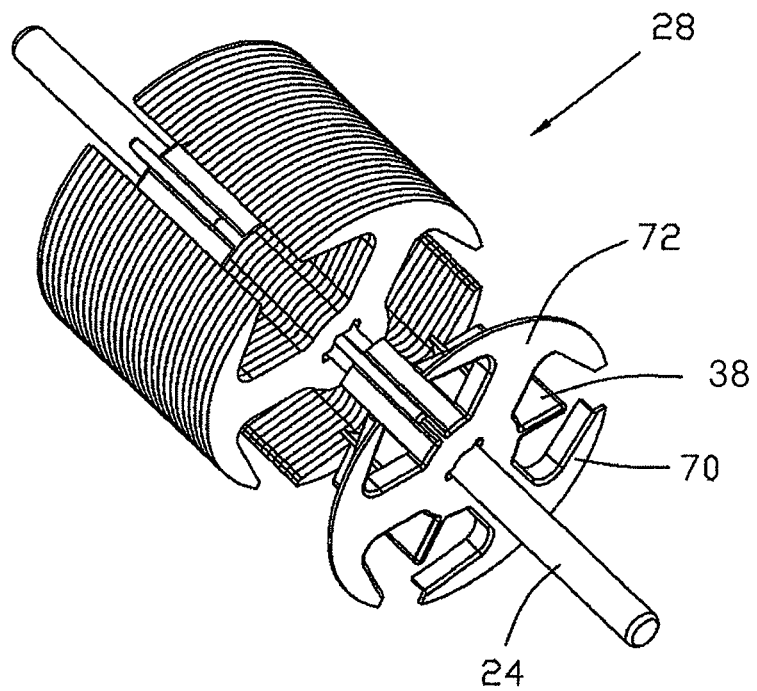
FIG. 7 shows a partially exploded view of a three pole armature core with a winding guide according to a further embodiment of the present invention.
Figure 8:
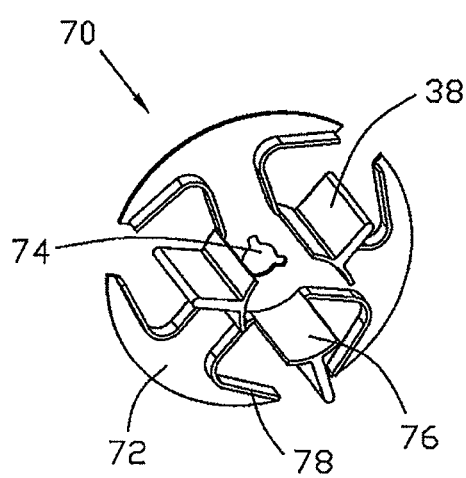
FIG. 8 is a perspective view of the winding guide of FIG. 7.

As an alternative to overmolding, the slot liner may be formed as a separate injection molded part, complete with wire guide which is fitted to the armature core before winding. Once wound, the windings hold the lining securely to the core but before winding, the slot liner is held in place by its geometry and often by the tightness of the fit between the slot liner and the shaft. One such embodiment is shown in FIG. 7 where the slot liner is shown partially assembled to the core. FIG. 8 is a perspective view of the slot liner of FIG. 7.

The slot liner 70 of FIGS. 7 & 8 has a base portion 72 in a shape similar to the lamination and has axially extending edge parts or lips 78 which extend into the winding tunnel to protect the wires from the sharp edges of the core. This portion is also known as a spider. A hole 74 receives the shaft 24 as a tight fit to hold the slot liner 70 in place before winding. Wings 76 extend axially from the spider to cover the floor or radially inner portion of the winding tunnel. Vanes forming the winding guides 38 extend radially from the wings 76. The wings 76 gives the winding guide lateral support when fitted to the core.

Actually, two slot liners according to the design of FIG. 8 are required to insulate the armature core or to protect the windings from sharp edges of the winding tunnels, one fitted at each end and meeting in the middle. Although it appears necessary for the two slot liners to meet and preferably interlock to provide a complete layer of protection, this is not always necessary and a gap can exist between the confronting edges of the two liners without any concern for safety or the effectiveness of the liner or of the winding guide. Indeed, a small gap is desired to ensure good fitting of the liner against the axial end faces of the core and to accommodate variations in the length of the core due to tolerances in the thicknesses of the individual laminations. Large gaps are also acceptable for some applications. Indeed, in the examples shown, the sides of the spokes of the inner laminations are not covered by the liner. For applications where complete coverage is necessary, the epoxy coating or overmolding alternatives are preferred.

Figure 9:
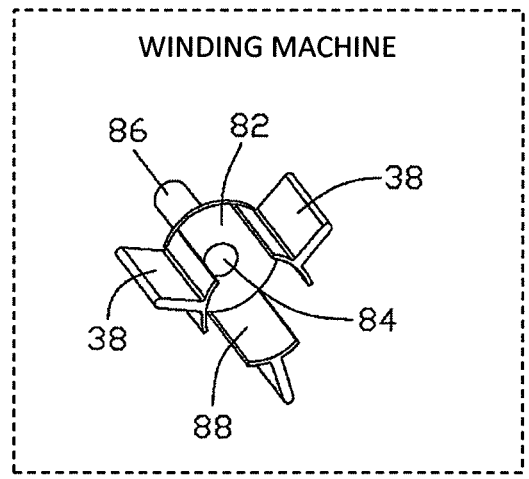
FIG. 9 is a perspective view of a removable wire guide according to yet another embodiment of the present invention.

FIG. 9 illustrates a removable winding guide assembly 80. The winding guide assembly 80 has a disc 82 with a central hole 84 for receiving the shaft 24. A boss 86 extends outwardly from the disc 82 and the hole 84 extends through the boss 86. Boss 86 provides additional support on the shaft and acts as a handle for installing and removing the assembly. Wings 88 extend axially from the disc to be located along the floor of the winding tunnel and vanes forming the winding guides 38 extend radially from the wings 88. The winding guide assembly 80 is inserted into the winding tunnel before winding and then removed after winding. Optionally, this may be done by a manual process. Alternatively, it could be incorporated into the winding machine as part of the armature pickup/holding mechanism in which during pick up or mounting of the armature in the winding machinery, the winding guides are placed within the winding tunnels and are removed as the wound armature is removed from the winding machine. For removable winding guides, it is preferred that they are made from a low friction material or coated with a low friction material to ease removal and avoid damaging the insulation on the wire of the windings which is typically an enamel insulation. One especially suitable low friction material is PTFE, also known by the trade name "TEFLON".

This invention is suited to armatures having salient poles where the armature windings are wound about individual discrete poles and not about multiple poles. In this respect, while such armatures with other numbers of salient poles are known, and may be helped by this invention, we found that armatures with three poles stand to benefit the most from this invention due to the simple winding process used and the greater sensitivity to armature winding imbalance and the winding dynamics of a three pole armature.

As can be appreciated from the preceding descriptions of the preferred embodiments, the winding guide divides or separates the radially inner portions of the winding tunnels into two portions. The purpose of this division or separation is to limit or locate the wire being wound about a salient pole, to the portion of the winding tunnels adjacent the pole about which the wire is wound. Put another way, the winding guides keep the coils of wire of each winding wound about the adjacent poles separate, within a common winding tunnel, at least the radially inner parts.

The embodiments described above are given by way of example only and various modifications will be apparent to persons skilled in the art without departing from the scope of the invention as defined in the appended claims.

The invention claimed is:
1. A permanent magnet direct current motor comprising:
 a wire wound salient pole rotor having a winding guide with a substantially uniform cross-sectional thickness and a free end, and extending radially outwardly from a radially inner surface of a single open ended winding tunnel formed between adjacent salient poles of the rotor,
 wherein the winding guide is structured and arranged to separate a radially inner portion of the winding tunnel into different sides and to restrain plural wire windings wound about the adjacent salient poles of the rotor from entering into an opposite inner portion of the single open ended winding tunnel, wherein the winding guide comprises a vane located within each winding tunnel, each vane extending along the single open ended winding tunnel and extending radially outwardly from a radially inner surface of the winding tunnel, wherein the salient poles are substantially T-shaped having a radially extending spoke extending from a central region and a circumferentially extending pole head foaming a pole face facing radially outwardly, each pole head extending between circumferentially spaced tips, a winding gap being fanned between tips of adjacent pole heads and the winding tunnels being formed between the central region and the spoke and pole head of adjacent poles and being open radially through the winding gap, wherein each vane extends along a radial plane that bisects the winding tunnel and one of the pole heads that is different from the adjacent pole heads that form the winding tunnel, projects towards the winding gap and has a radial height sufficient to separate adjacent windings within the winding tunnels but equal to or less than a maximum radial height being defined by intersection of the radial plane with a line extending from one of the tips between which the winding gap is formed to one tip of the one of the pole heads bisected by the radial plane, and wherein the one of the tips between which the winding gap and the one tip of the one of the pole heads bisected by the radial plane are located on different sides bisected by the radial plane.

2. The permanent magnet direct current motor of claim 1, wherein the height of the vanes are approximately half of the height of the winding tunnel.

3. The permanent magnet direct current motor of claim 1, wherein the rotor has a core formed of stacked laminations of electrical steel and the vanes comprise fingers of the laminations.

4. The permanent magnet direct current motor of claim 1, wherein the winding guide is a separately formed item adapted to be slidably fitted to a core of the rotor before winding.

5. The permanent magnet direct current motor of claim 1, wherein the winding guide is an integral part of a slot insulation.

6. The permanent magnet direct current motor of claim 5, wherein the slot insulation is molded directly onto the core of the rotor.

7. The permanent magnet direct current motor of claim 1, wherein the winding guide is adapted to slidably fit inside of and be removable from the winding tunnel.

8. The permanent magnet direct current motor of claim 1, wherein the winding guide is at least partially formed of low friction material.

9. The permanent magnet direct current motor of claim 1, wherein the winding guide is a part of a winding machine.

10. The permanent magnet direct current motor of claim 1, wherein the rotor has three salient poles.

11. The permanent magnet direct current motor of claim 1, wherein the winding guide is not part of metal laminations of the rotor but is in the form of a slot liner separate from the metal laminations of the rotor and adapted to be connected to an outside surface of a metal rotor lamination.

12. The permanent magnet direct current motor of claim 11, wherein the slot liner includes edge portions adapted to fit into the winding tunnel to line a portion of winding tunnel metal laminations.

* * * * *